United States Patent
Douglas et al.

(10) Patent No.: US 12,489,732 B2
(45) Date of Patent: Dec. 2, 2025

(54) SYSTEMS AND METHODS FOR PERFORMING SECURE COMMUNICATIONS WITH ROTATING KEY COMMUNICATIONS

(71) Applicant: Capital One Services, LLC, McLean, VA (US)

(72) Inventors: Lawrence Douglas, McLean, VA (US); Kevin Keenan, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 286 days.

(21) Appl. No.: 18/455,837

(22) Filed: Aug. 25, 2023

(65) Prior Publication Data

US 2025/0071093 A1     Feb. 27, 2025

(51) Int. Cl.
*H04L 9/40* (2022.01)
(52) U.S. Cl.
CPC ...... *H04L 63/0254* (2013.01); *H04L 63/0236* (2013.01); *H04L 63/061* (2013.01)
(58) Field of Classification Search
CPC ............. H04L 63/0254; H04L 63/0236; H04L 63/061
See application file for complete search history.

(56) References Cited

U.S. PATENT DOCUMENTS

2020/0106609 A1 * 4/2020 Osborn ................. H04L 9/0891

FOREIGN PATENT DOCUMENTS

WO     WO-2020072626 A1 * 4/2020 ............. H04W 4/80

* cited by examiner

*Primary Examiner* — Hee K Song
(74) *Attorney, Agent, or Firm* — Foley & Lardner LLP (57) ABSTRACT

Systems and methods are described for performing secure communications with rotating key communications. For example, the system may receive a first applet request to perform a first rotating key communication across one or more computer networks to access a first server host. The system may then determine a first processing characteristic for the first applet request and a first plurality of server locations of the first server host (e.g., across the one or more computer networks). The system may then determine a first plurality of connection paths to a first subset of the first plurality of server locations. The system may then filter the first plurality of connection paths to generate a first subset of the plurality of connection paths. Based on the first subset of the plurality of connection paths, the system may generate a first rotating key for performing the rotating key communication.

20 Claims, 4 Drawing Sheets

SYSTEMS AND METHODS FOR PERFORMING SECURE COMMUNICATIONS WITH ROTATING KEY COMMUNICATIONS

BACKGROUND

As the world increasingly moves toward the use of electronic communications as the predominant communication method, the amount and type of data that are subject to electronic communications continue to expand. In many cases, these electronic communications are built on network infrastructure that was not designed to accommodate different types of electronic communications and, in particular, these types of communications in the current amounts.

SUMMARY

Systems and methods are described herein for improving the security and reliability of electronic communications, particularly in instances in which the electronic communications include sensitive data such as personal user data, personal transaction data, and/or other nonpublic data. To achieve the improvements in security and reliability, the systems and methods diverge from conventional networking infrastructure in which the existing networking infrastructure dictates specific characteristics of an electronic communication.

For example, in a conventional system, an electronic communication may indicate a particular address and/or parties to an electronic communication. However, the address and/or party to the electronic communication may comprise a plurality of different components of the network infrastructure that relate to the same address (e.g., multiple servers, multiple connection paths, multiple routers, switches, and/or other gates, etc.). The different components that are used to complete the electronic communication are assigned by the network that governs the electronic communication. This reliance on the network to determine the components, etc. also means that the network is relied upon to ensure security and reliability for the electronic communication.

The systems and methods described herein improve the security and reliability of electronic communications by allowing an applet on one device (e.g., a device initiating an electronic communication) to provide a processing characteristic that determines the one or more components used to facilitate the electronic communication. For example, based on the processing characteristic, the applet may select a specific component (e.g., server, server bank, connection path, etc.) used by the electronic communication. Upon selecting a specific component, the applet may generate a rotating key, for a pair of devices (e.g., a device upon which the applet resides and the specific server), for performing the electronic communication. By doing so, the systems and methods introduce an additional layer of security and reliability that is not governed by the network and/or the network's infrastructure.

In some aspects, systems and methods are described herein for performing secure communications with rotating key communications. For example, the system may receive a first applet request to perform a first rotating key communication across one or more computer networks to access a first server host. The system may determine a first processing characteristic for the first applet request. The system may determine a first plurality of server locations of the first server host across the one or more computer networks. The system may determine a first plurality of connection paths to a first subset of the first plurality of server locations. The system may filter the first plurality of connection paths based on the first processing characteristic to generate a first subset of the first plurality of connection paths. The system may generate a first rotating key, for a pair of devices, for performing the first rotating key communication based on the first subset of the first plurality of connection paths.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
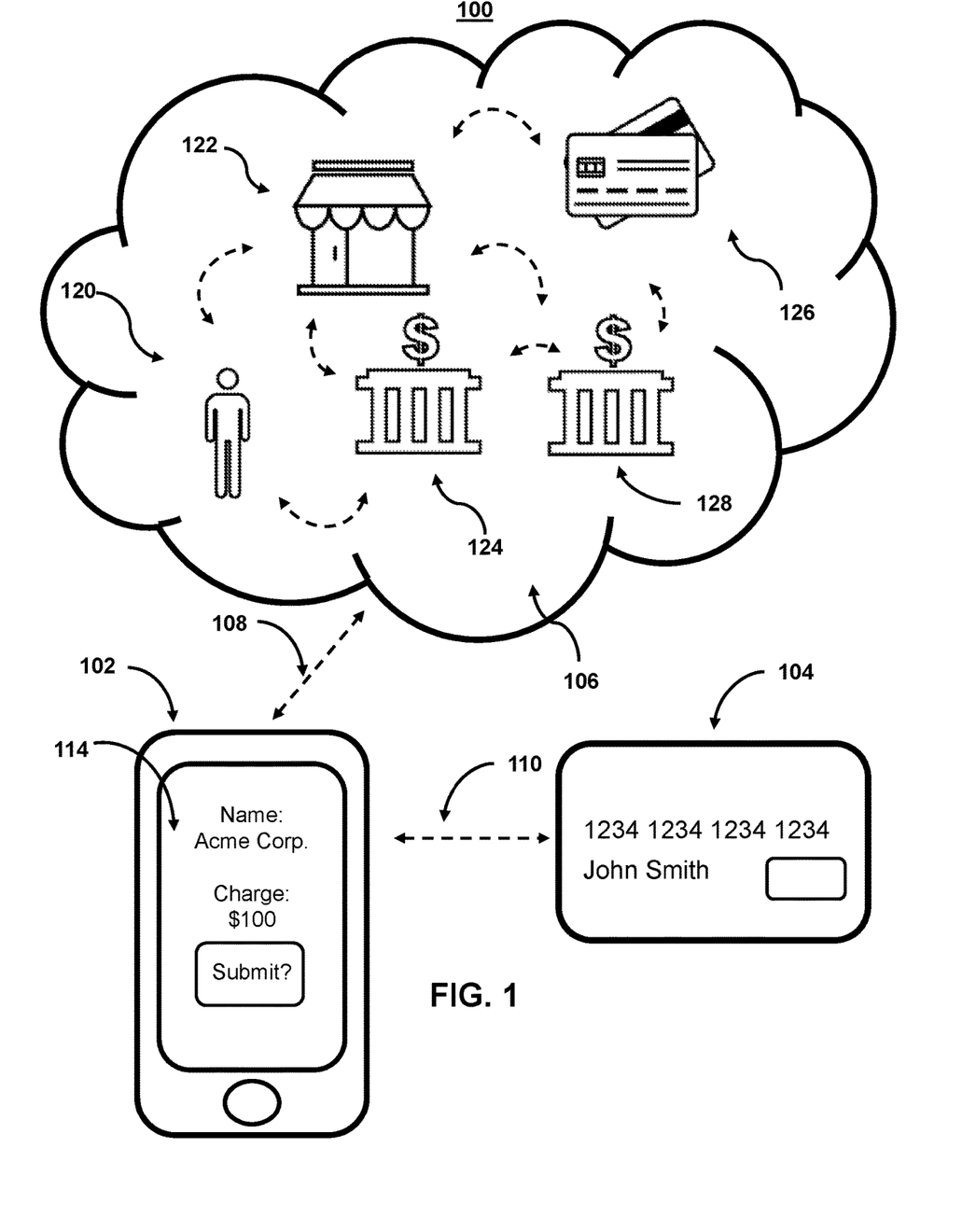
FIG. 1 shows an illustrative system for performing secure communications with rotating key communications using applets linked to near field communication tags, in accordance with one or more embodiments.

FIG. 1 shows an illustrative system for performing secure communications with rotating key communications using applets linked to near field communication tags, in accordance with one or more embodiments. As shown in FIG. 1, system 100 may include mobile device 102, card 104, and cloud server 106. It should be noted that each component of system 100 may include additional subcomponents (e.g., additional servers and/or networks). System 100 may be used to process communications that may include but are not limited to data related to transactions and/or other content.

For example, system 100 may process communications related to transactions and/or payment delivery that are rerouted around traditional payment networks. For example, system 100 may generate direct connections by rerouting the payment from the payment gateway or processor around the payment networks. Alternatively or additionally, the communications may comprise other content. As referred to herein, "content" should be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices but can also be part of a live performance. Furthermore, user generated content may include content created and/or consumed by a user. For example, user generated content may include content created by another but consumed and/or published by the user.

As one example, transaction cards (e.g., credit cards, debit cards, and/or other transactions) issued through a conventional payment network may require merchants to pay an interchange fee. The interchange fee may be split between the payment networks and the issuing bank. To avoid these interchange fees, merchants may conduct direct payments with issuers using a direct path to conduct a payment that avoids interchange fees and describes how that payment should be handled within the financial core. Additionally or alternatively, in some embodiments, the system may create an account (e.g., not linked to a transaction card) where a card does not need to be used, but credit may be extended to the user to conduct non-credit card transactions. The account may be a direct payment account not directly associated with the card. By creating a separate account for direct payment, the terms of the payment could be different (e.g., lending as a service, different interest rate, different grace period, promotional terms, etc.)

System 100 may describe performing secure communications with rotating key communications using applets linked to near field communication tags. For example, a rotating key may comprise an encryption key and/or other security protocol that is regularly changed. By regularly rotating a key, system 100 ensures that it is resilient to a security breach. For example, system 100 may rotate keys automatically on a regular schedule. In some embodiments, system 100 may use a rotation schedule that defines a frequency of rotation and, optionally, the date and time when the first rotation occurs. In some embodiments, system 100 may determine a rotation schedule based on a key's age and/or a number and/or volume of communications encrypted with a key version.

System 100 may receive an applet request to perform a rotating key communication (e.g., to access a server host) from mobile device 102 and may determine a processing characteristic for the applet request. Using the processing characteristic, system 100 may interact with one or more components to determine a plurality of connection paths (e.g., to which the server host is accessible) and provide a rotating key for performing a rotating key communication. As such, the system may determine the most efficient and/or secure path to access the server host based on the processing characteristic—thereby reducing system latency and cost (e.g., to perform the rotating key communication).

The system may use a processing characteristic to filter a plurality of connection paths. As referred to herein, a "processing characteristic" may include any characteristic that is related to performing a rotating key communication (e.g., a characteristic of a user, merchant, applet, and/or transaction). In some embodiments, the processing characteristic may comprise a maximum fee. In some embodiments, the processing characteristic may comprise a known entity (e.g., a specific network). In some embodiments, the processing characteristic may comprise an application programming interface. In some embodiments, the processing characteristic may comprise a processing speed for a rotating key for the communication. In some embodiments, the processing characteristic may comprise an applet request to batch the first rotating key communication. In some embodiments, the processing characteristic may comprise an applet request to batch the first rotating key communication in a batch of a given size.

In some embodiments, the system may determine the processing characteristic based on the applet request. For example, by determining the processing characteristic based on the applet request (e.g., an input from the applet specifying the processing characteristic), the system may generate a rotating key communication that is the most efficient and consistent with the applet's request. Additionally or alternatively, the system may determine the processing characteristic based on a predetermined processing characteristic. For example, the predetermined processing characteristic may be based on a set of historical applet requests, where the predetermined processing characteristic is selected based on the highest value (e.g., percentage, number, etc.) of applets selecting a given processing characteristic over all other processing characteristics available. As another example, the predetermined processing characteristic may be a default processing characteristic (e.g., set as default by the applet). For example, the system may select a given process characteristic as a default processing characteristic (e.g., secure networks only, lowest overall cost). By using a predetermined processing characteristic, the system may generate a rotating key for the communication that is the most efficient when the user may not know which processing characteristic to select.

The system may filter the plurality of connection paths to generate a subset of the plurality of connection paths. As referred to herein, a "filtering" may include any filtering criteria for generating a subset of connection paths (e.g., to access a host server). In some embodiments, the filtering may be based on a processing characteristic.

In some embodiments, the system may filter a plurality of connection paths based on the use of a specific network. For example, by filtering the plurality of connection paths based on the use of a specific network, the system may generate a recommendation that uses a specific network (e.g., such as a safe network). Additionally or alternatively, the system may generate the subset of connection paths by filtering the set of connection paths based on a maximum fee. For example, by filtering the set of connection paths based on a maximum fee, the system may recommend a processing route that is associated with a reduced cost for performing the rotating key communication. Additionally or alternatively, the system may generate the subset of connection paths by filtering the set of connection paths based on an application programming interface. For example, by filtering the set of connection paths based on an application programming interface, the system may generate a recommendation that is financially resilient. Additionally or alternatively, the system may generate the subset of connection paths by filtering the set of connection paths based on a processing speed for a rotating key communication. For example, by filtering the set of connection paths based on the processing speed for the rotating key communication, the system may reduce system latency. Additionally or alternatively, the system may generate the subset of connection paths by filtering the set of connection paths based on batching the rotating key communication. For example, by filtering the set of connection paths based on batching the rotating key communication (or batching based on a given size), the system may reduce the load on the network while also reducing network latency. Additionally or alternatively, the system may generate the subset of connection paths by filtering the set of connection paths based on a particular entity. For example, by filtering the set of connection paths based on a particular entity, the system may increase rotating key communication security (e.g., where the particular entity is a safe or secure entity).

Mobile device 102 (which may correspond to a user's mobile device and/or other point-of-sale terminal) may interact with card 104. Card 104 may comprise a near field communication tag (e.g., as further described in FIG. 2 and otherwise herein). For example, card 104 may comprise an applet that creates on-card logic for direct payments. An applet may comprise a small computer program that performs a specific task. The applet may be embedded within another larger app or software platform and has the limited functionality of a non-powered device. By doing so, system 100 allows applets to run quickly and reliably without demanding resources. In some embodiments, an applet may comprise any small application that performs one specific task that runs within the scope of a dedicated widget engine or a larger program, often as a plug-in. In some embodiments, the applet may comprise a Java applet, which is a program written in the Java programming language. The applet may be stored in on-card logic (e.g., control circuitry and/or other non-transitory, computer-readable medium on card 104).

While shown as a smartphone in FIG. 1, it should be noted that mobile device 102 and card 104 may be any computing device, including, but not limited to, a laptop computer, a tablet computer, a handheld computer, and other computer equipment (e.g., a server), including "smart," wireless, wearable, and/or mobile devices. FIG. 1 also includes cloud server 106. Server 106 may alternatively be any computing device as described above and may include any type of mobile terminal, fixed terminal, or other device. For example, server 106 may be implemented as a cloud computing system and may feature one or more component devices. It should also be noted that system 100 is not limited to three devices. Users may, for instance, utilize one or more other devices to interact with one another, one or more servers, or other components of system 100. It should be noted that, while one or more operations are described herein as being performed by particular components of system 100, those operations may, in some embodiments, be performed by other components of system 100. As an example, while one or more operations are described herein as being performed by components of mobile device 102, those operations may, in some embodiments, be performed by components of server 106. In some embodiments, the various computers and systems described herein may include one or more computing devices that are programmed to perform the described functions. Additionally or alternatively, multiple users may interact with system 100 and/or one or more components of system 100. For example, in one embodiment, a first user (e.g., a credit card holder) and a second user (e.g., a merchant/source, a credit card issuer, etc.) may interact with system 100 using two different components.

With respect to the components of mobile device 102, card 104, and server 106, each of these devices may receive content and data via input/output (hereinafter "I/O") paths. Each of these devices may also include processors and/or control circuitry to send and receive commands, requests, and other suitable data using the I/O paths and I/O circuitry. The control circuitry may comprise any suitable processing circuitry. Each of these devices may also include a user input interface and/or user output interface (e.g., a display) for use in receiving and displaying data. As shown in FIG. 1, mobile device 102 includes a display upon which to display data. Additionally, as mobile device 102 is shown as a touch-screen smartphone, these displays also act as user input interfaces. It should be noted that, in some embodiments, the devices may have neither user input interfaces nor displays and may instead receive and display content using another device (e.g., a dedicated display device such as a computer screen and/or a dedicated input device such as a remote control, mouse, voice input, etc.). Additionally, the devices in system 100 may run an application (or another suitable program). The application may cause the processors and/or control circuitry to perform operations related to performing secure communications with rotating key communications using applets linked to near field communication tags (e.g., either transmitting requests between components, receiving requests between components, and/or processing requests between components). For example, the processors may be programmed to provide information processing capabilities in the computing devices. As such, the processors may include one or more digital processors, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

FIG. 1 also includes communication paths 108 and 110. Communication paths 108 and 110 may include the Internet, a mobile phone network, a mobile voice or data network (e.g., a 4G or LTE network), a cable network, a public switched telephone network, or other types of communications network or combinations of communications networks. Communication paths 108 and 110 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices. In some embodiments, communication path 110 may comprise a near field communication (e.g., as further described in relation to FIG. 2).

Server 106 may be a database configured to store user data, record data, and/or process requests for performing secure communications. For example, the database may include user record data that the system has collected about the user through prior transactions. Alternatively or additionally, the system may act as a clearing house for multiple sources of information about the user. Server 106 may also include control circuitry configured to perform the various operations needed to perform secure communications. For example, server 106 may receive from mobile device 102, or card 104, an authentication request for a user.

As shown, system 100 may involve multiple components and involve requests from one or more entities, such as user 120. A user 120 may include a user that accesses an aggregation service in order to aggregate transactions of that user. For example, a given user may have multiple credit card accounts and thus correspond to a user for multiple credit card networks. It should be noted that, as referred to herein, a credit card network may include debit cards, e-commerce accounts, source credit, and other electronic payment and/or monetary systems, such as online user currency accounts, cryptocurrencies, credit provider accounts, gift card accounts, etc.

System 100 may also include source 122, which may be associated with a store and/or vendor that sells goods and/or services to the user. Source 122, which may be a merchant, may accept credit card payments. Source 122 may also send card and/or user account information to, and request payment authorization from, an issuing bank of user 120. Source 122 may be assigned information by a network upon registration. That information may include a merchant/source ID, a network name, and an address. The network may further generate a cleansed network name based on a native network name (e.g., a network name based on a proprietary and/or nonpublic algorithm for generating a network name based on available data of a merchant when the merchant registers with the network).

For example, as part of a request, an exemplary source record for a network may include:

---
Merchant ID: 12345
Network Name: Josh's Board Game Store
Address: 1234 Main St., City, State 12346
---

Source 122 may include an acquiring bank 124, which may also comprise an acquiring processor or service provider. For example, the acquiring bank may receive payment authorization requests from source 122 and send them to issuing bank 128 (which may include, or be a separate entity from, acquiring bank 124). The acquiring bank 124 may then relay a response from issuing bank 128 to source 122. In some embodiments, acquiring bank 124 may be a third-party entity. Acquiring bank 124 may provide a service or device that allows source 122 to accept credit cards as well as send credit card payment details to network 126. Upon receipt, network 126 may forward the payment authorization back to acquiring bank 124.

Network 126 may include entities that operate credit card networks that process credit card payments worldwide and govern interchange fees. In some embodiments, issuing bank 128 may form part of network 126. For example, issuing bank 128 may be a financial institution that issued the credit card involved in the transaction. Issuing bank 128 may receive the payment authorization request from the credit card network and either approve or decline the transaction.

When processing an applet request, generating a rotating key, and/or exchanging communications, the components of system 100 may use multiple naming conventions, formats, and value types of a category, value, etc., and these may differ from that of the user profile data (as stored on a user device or a platform service). Server 106 (or other component of system 100) may use matching algorithms that may support exact match techniques and/or partial or "fuzzy" matching logic (e.g., searching for a closest or partial match) to locate alternate spellings, naming conventions, etc. for categories and/or value.

In some embodiments, system 100 may compare data between system components during a transaction and/or aggregation of record data. For example, credit card transactions are processed through a variety of platforms, including brick-and-mortar stores, e-commerce stores, wireless terminals, and phone or mobile devices. The entire authorization cycle takes within two to three seconds, and the transaction process includes three stages of authorization, clearing, and settlement, in which clearing and settlement may take place simultaneously. In an authorization stage, source 122 must obtain approval for payment from issuing bank 128. Source 122 may transmit record data that may include a credit card number, card expiration date, billing address (e.g., for address verification system (AVS)), a validation card security code (CVV), and/or a payment amount.

As the transaction moves through system 100, issuing bank 128 may receive the payment authorization request from network 126. Issuing bank 128 validates the credit card number, checks the amount of available funds, matches the billing address to the one on file, and validates the CVV number. Issuing bank 128 approves or declines the transaction and sends back an appropriate response to source 122 through system 100 (e.g., via network 126 and/or acquiring bank 124). Source 122 may receive the authorization, and issuing bank 128 may place a hold in the amount of the purchase on the account of user 120. A point-of-sale terminal may send all approved authorizations to be processed in a "batch" (e.g., at the end of a day, accounting period, etc.). Notably, transmitting authorizations in batches increases the need for accurate and precise data and/or conflict resolutions at a high rate of speed.

During the clearing stage, the transaction is posted to both a credit card account of user 120 and source 122. Source 122 then sends the approved authorizations in a batch to acquiring bank 124. Acquiring bank 124 then routes the batched information to network 126 for settlement. Network 126 forwards each approved transaction to an appropriate issuing bank 128. Issuing bank 128 will transfer the funds and may withhold exchange fees. Network 126 may also pay acquiring bank 124 a fee. Issuing bank 128 may then post the user record data to an account of user 120.

Accordingly, a single transaction includes multiple systems, each interacting with each other and handling user data that must be stored, transmitted, and verified in a precise manner. Furthermore, each of these interactions may comprise a different communication path, subset of communication paths, and/or server location. In order to ensure precision, each system and/or component of a system may use its own (and, in many cases, proprietary) encoding mechanisms. Additionally or alternatively, source 122, acquiring bank 124, network 126, and/or issuing bank 128 each transmit a network name (e.g., an identification system used by an assigning party to indicate a source (e.g., source 122) corresponding to a transaction). However, as each system may use a private (and likely proprietary) algorithm for facilitating transactions, a network name generated and used by one component (e.g., network 126) may not be the same as the network name used by another network.

Accordingly, the system may determine a first plurality of server locations of the first server host across the one or more computer networks. For example, the system may determine a plurality of servers located with a specific merchant and/or platform service. In some embodiments, other information may vary as well. For example, information about a source (e.g., known server host domain addresses) may not be updated and/or correspond to a particular location, corporate headquarters, or other address for all transactions with the source. Likewise, time stamp information may be transmitted in different formats (or correspond to different time zones). Payment information may have slight variations due to fees charged by different system components. In such cases, the system may reconstitute the original charge made by the user (e.g., user 120) based on exchange fee information.

As referred to herein, an applet request may comprise any graphical, audio, textual, and/or video cue. The applet request may be generated to be unique to a user, transaction, and/or merchant. For example, in response to detecting a payment request, the system may retrieve a user profile for a user and/or merchant.

The applet request and/or the rotating key may comprise, be based on, and/or be generated by the system based on information specific to a user, merchant, and/or transactions. For example, the applet request and/or the rotating key may be based on data from a user profile. The user profile may include data that is actively or passively compiled on a user and/or merchant. For example, the data may include demographic, geographic, and/or financial data on the user and/or merchant. The data may indicate the preferences, tastes, habits, and/or recent activities of the user and/or merchant (e.g., recent purchases). The user profile may comprise a digital representation of the user and/or merchant. This representation may be organized into a user profile and behaviors of the user and/or merchant, including likely purchases/sales and sources from which purchases/sales were made. The representation may include any information about an event, course of action, or other circumstance related to the user and/or merchant. For example, the scenario may include where a user last shopped, where the user normally shops, what items were purchased, etc. The profile may also include a behavior for the user and/or merchant in the given scenario (e.g., the manner, way, characteristics, and/or any other information about the user's conduct in a scenario). The profile may also include one or more categories in which the user and/or merchant falls. These categories may be used by the system to select other users and/or merchants to compare to the users and/or merchants. The categories may include any information that distinguishes one user and/or merchant from another or from a group of other users and/or merchants.

The user profile may include data of various types and from various sources. For example, the user profile may include data on credit/debit card purchases, purchasing trends (e.g., where the user spends, what the user buys, how much the user spends), phone call interactions (e.g., how often a user calls, the number called, and the number called from), digital engagement history of the user (e.g., does the user use a mobile app, what devices does the user use, when and how often does the user log in), text/chat history, and map and global positioning data (e.g., where the user is located, where the user has been located in the past, areas frequented by a user, distances traveled by a user, where does a user shop, where were the purchases of the user, etc.).

The system may record the scenarios, behaviors, and user profiles as records in a database. The records may include fields with particular values corresponding to given behaviors. For example, a value for a behavior related to a shopping scenario may indicate what a user purchased, for how much, or where a user purchased a good or service. In some embodiments, the system may store alphanumeric values (e.g., describing a product that was purchased). For example, a value may, in some embodiments, include any quantitative or qualitative measure of the behavior of a user in a given scenario.

For example, the system may generate a rotating key communication (e.g., a communication comprising the use of a rotating key). The communication may comprise an electronic communication and involve any content. For example, the communication may comprise a credit and/or other payment transaction. The communication may indicate a particular address and/or parties to the transaction (e.g., a credit network). However, the address and/or party to the communication may comprise a plurality of different components of the network infrastructure that relate to the same address (e.g., multiple servers, multiple connection paths, multiple routers, switches, and/or other gates, etc. for a given credit network).

The applet on one device (e.g., a device initiating the communication) may provide a processing characteristic that determines the one or more components used to facilitate the communication. For example, based on the processing characteristic, the applet may select a specific component (e.g., server, server bank, connection path, etc. of the credit network) used by the communication. Upon selecting a specific component, the applet may generate a rotating key, for a pair of devices (e.g., a device upon which the applet resides and the specific server), for performing the electronic communication. By doing so, the systems and methods introduce an additional layer of security and reliability that is not governed by the network and/or the network's infrastructure.

Figure 2:
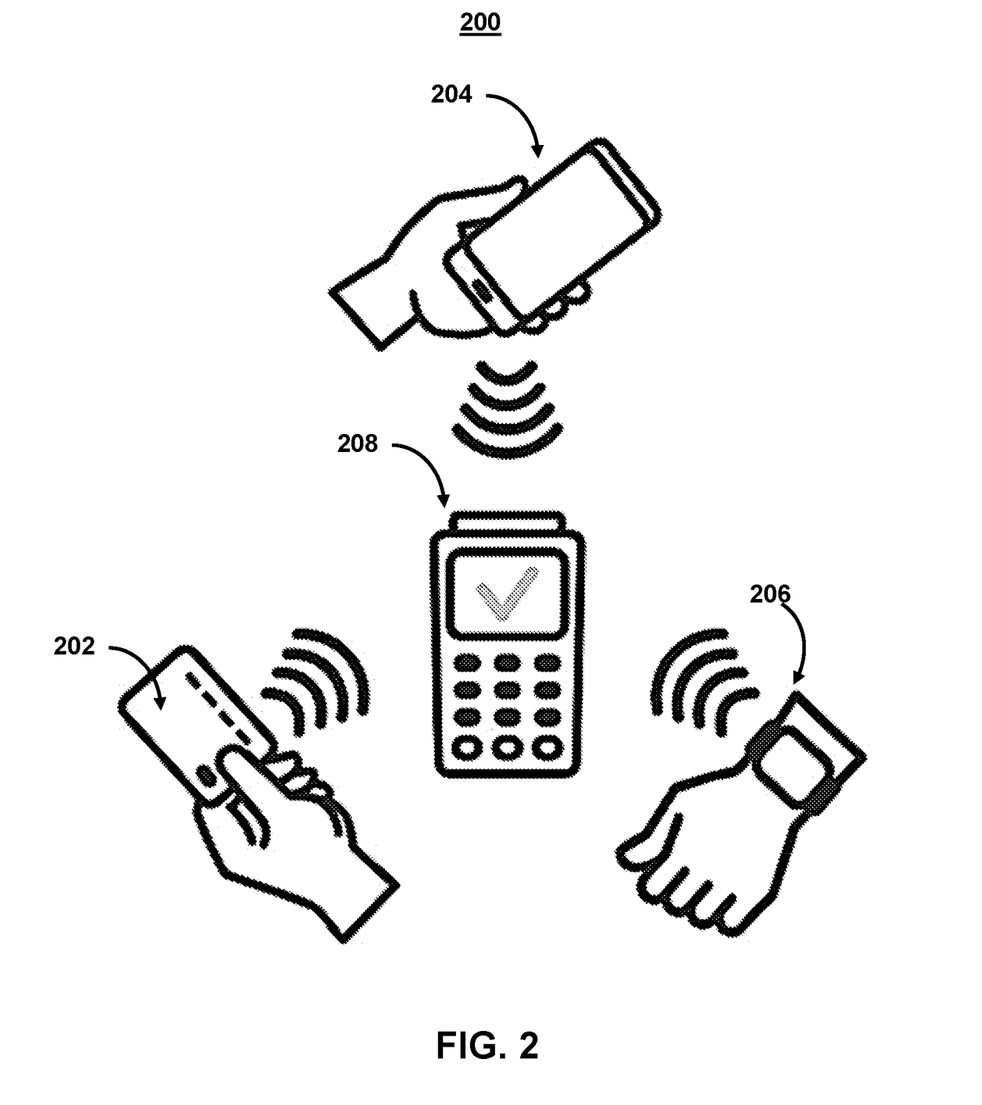
FIG. 2 shows an illustrative diagram for near field communications, in accordance with one or more embodiments.

FIG. 2 shows an illustrative diagram for near field communications, in accordance with one or more embodiments. As shown in FIG. 2, system 200 may comprise one or more devices (e.g., credit card 202, mobile device 204, wearable device 206, and point-of-sale terminal 208). For example, the communications described herein may be issued by a plurality of devices and relate to a plurality of payment methods, such as mobile payment solutions or host card emulation wallets that can pass a generic payment token or pass to securely identify a customer and pass a valid payment token for an amount of a transaction.

In some embodiments, point-of-sale terminal 208 may facilitate reading a QR code (or Quick Response code) that evaluates to a payment token or an actual number that is a payment token (e.g., virtual card) for direct payment. For example, a QR code is an array of black and white squares or pixels set in a grid that stores data for a machine to read. A smartphone (e.g., mobile device 204) or camera may quickly process the information contained in a QR code's specific arrangement of pixels, making it a convenient way to store and access data. Alternatively or additionally, merchants may use one or more of the devices to pass through charges directly to a credit issuer, where it may be applied to the user's account.

Each of the devices in system 200 may use near field communications to exchange information. For example, system 200 may represent a contactless payment system. These payment systems may use near field communication technology to securely and quickly transfer payment information from a device (e.g., credit card 202, mobile device 204, and/or wearable device 206) to a merchant's payment terminal (e.g., point-of-sale terminal 208).

In some embodiments, the system may use a set of communication protocols that enables communication between two electronic devices over a distance of 4 cm (1.57 in) or less. For example, using near field communications, the devices in system 200 may use a low-speed connection through a simple setup that can be used to bootstrap more capable wireless connections. In some embodiments, communications may be based on inductive coupling between two so-called antennas present on the devices communicating in one or both directions using a frequency of 13.56 MHz and at data rates ranging from 106 to 424 kbit/s.

Each of the devices in system 200 may comprise near field communication tags, which may comprise a near field communication chip and antenna. For example, by using a near field communication tag, system 200 may enable two-way communication.

Figure 3:
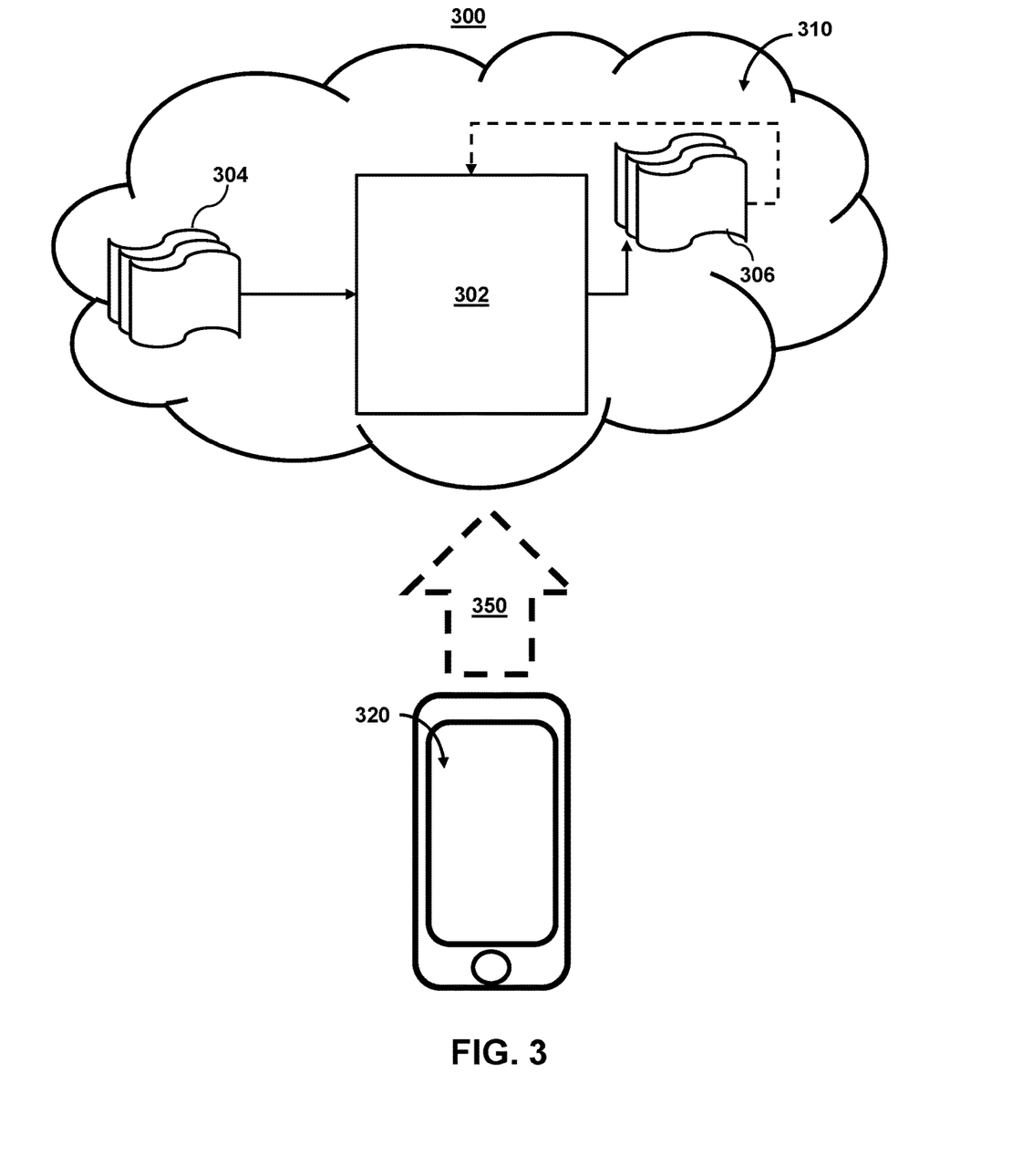
FIG. 3 shows illustrative components for a system used to perform secure communications with rotating key communications, in accordance with one or more embodiments.

FIG. 3 shows illustrative components for a system used to perform secure communications with rotating key communications, in accordance with one or more embodiments. For example, FIG. 3 may show illustrative components for performing secure communications with rotating key communications using applets linked to near field communication tags. As shown in FIG. 3, system 300 may include mobile device 320. While shown as a smartphone in FIG. 3, it should be noted that mobile device 320 may be any computing device, including, but not limited to, a laptop computer, a tablet computer, a handheld computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 320, these operations may, in some embodiments, be performed by components of cloud components 310. In some embodiments, the various computers and systems described herein may include one or more computing devices that are programmed to perform the described functions. Additionally or alternatively, multiple users may interact with system 300 and/or one or more components of system 300. For example, in one embodiment, a first user and a second user may interact with system 300 using two different components.

In some embodiments, an applet request to perform secure communications may be structured as an API request that includes a URL (Uniform Resource Locator), body, and method. The API request may correspond to one-half of the API request-response cycle between one or more devices and/or applications to complete the request. For example, the system (e.g., mobile device 320 and cloud components 310) may communicate in HTTP (Hyper Text Transfer Protocol) through a request-response cycle. To make a valid request, the requester (e.g., mobile device 102) may include a URL, method, list of headers, and/or body. The URL may indicate to server 106 (or other component) what resources to use (e.g., "PaymentRequest"). The body may contain headers and data. The headers may provide metadata about the request (e.g., the name of the requester, the user account for which access is needed, etc.), and the body may indicate the name of the user to which a request relates.

System 300 may be used for performing secure communications. One component may be an application running on a mobile device of a user (e.g., mobile device 320). As referred to herein, user record data may include any data related to a transaction. For example, the record data may include a paper or electronic record containing information about the transaction, such as transaction amount, transaction number, transaction date and time, transaction type (deposits, withdrawal, purchase, or refund), type of account being debited or credited, card number, identity of the card acceptor (e.g., merchant/source, including source address, identification or serial number, and/or terminal (e.g., name from which the terminal operates)). For example, an exemplary record data for a transaction may include:

---

Transaction ID: 01234
Timestamp: 1/1/2020 01:30:55 AM UTC
Price: $57.98
Payment Currency: USD
Card Present: True
Merchant ID: 12345

---

Through the user of the application, the system may allow a user to transmit a request using mobile device 320. In response to receiving the request, a platform service (e.g., located at cloud component 310) may process the request and initiate a payment to respond to the request.

Cloud components 310 may include model 302, which may be a machine learning model, artificial intelligence model, etc. (which may be referred to collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a rotating key, a subset of the plurality of server locations, and/or the plurality of server locations of the first server host across the one or more computer networks).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, backpropagation techniques may be utilized by model 302 where forward stimulation is used to reset weights on the "front" neural units. In some embodiments, stimulation and inhibition for model 302 may be more free flowing, with connections interacting in a more chaotic and complex fashion. During testing, an output layer of model 302 may indicate whether or not a given input corresponds to a classification of model 302.

In some embodiments, the neural network may be trained based on training data comprising authentication characteristics, locations of server hosts, processing characteristics (e.g., processing characteristics associated with an applet request, parameters or other constraints specified in applet requests, etc.), or other training data. For example, the neural network may take in (i) network characteristic(s), (ii) the locations of server(s), or (ii) processing characteristic(s) as input and generate an output. The output may comprise a set of connection paths associated with accessing the server(s). In some embodiments, the output may be fed back into the neural network to update one or more configurations (e.g., weighs biases or other parameters based on its assessment of its prediction (e.g., output) and reference feedback information (e.g., user indication of accuracy, reference labels, or other information)). In some embodiments, the reference feedback information may include rotating key communication result information (e.g., a result related to conducting one or more rotating key communications).

System 300 also includes API layer 350. API layer 350 may allow the system to generate summaries across different devices. In some embodiments, API layer 350 may be implemented on mobile device 320. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web services, using resources like Service Repository and Developer Portal but with low governance, standardization, and separation of concerns. Alternatively, system 300 may be fully based on API layer 350, such that separation of concerns between layers like API layer 350, services, and applications is in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDOS protection, and API layer 350 may use RESTful APIs as standard for external integration.

Figure 4:
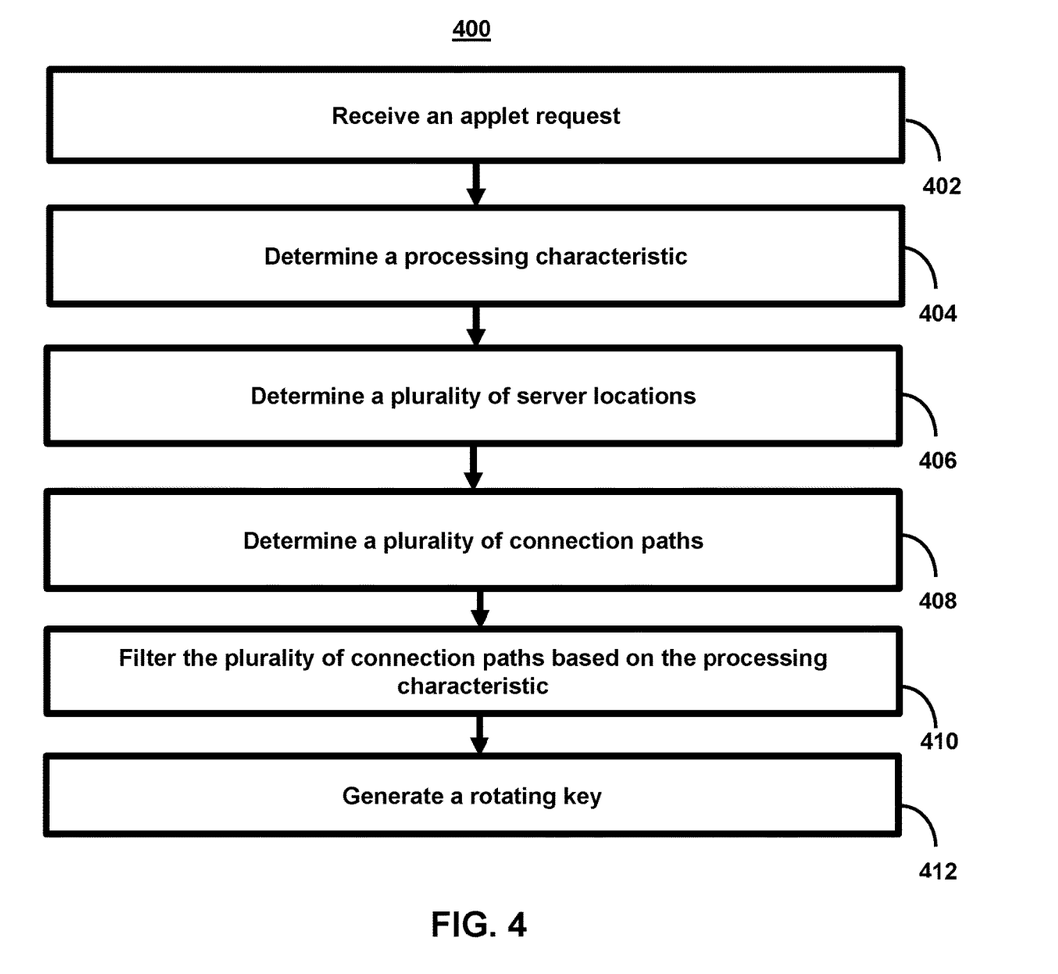
FIG. 4 shows a flowchart of the steps involved in recommending network processing routes when conducting rotating key communications, in accordance with one or more embodiments.

FIG. 4 shows a flowchart of the steps involved in performing secure communications with rotating key communications, in accordance with one or more embodiments. For example, the system may use process 400 (e.g., as implemented on one or more system components described above) in order to perform secure communications with rotating key communications using applets linked to near field communication tags.

At step 402, process 400 (e.g., using one or more components described above) receives a first applet request. For example, the system may receive a first applet request to perform a first rotating key communication across one or more computer networks to access a first server host. In some embodiments, the system may receive the applet request in response to activities of one or more near field communication devices. For example, a first device may detect that a second device is within a predetermined location, wherein the second device comprises a near field communication tag and a first applet, wherein the first applet is configured to facilitate the first applet request in response to being within the predetermined location. The second device may transmit the first applet request.

At step 404, process 400 (e.g., using one or more components described above) determines a processing characteristic. For example, the system may determine a first processing characteristic for the first applet request. The first processing characteristic for the first applet request may be a specific merchant server domain, geographic location, transaction type, transaction amount, processing speed, use of a specific network, maximum fee, an application programming interface, an applet request to batch the first rotating key communication (or batch the first rotating key communication in a batch of a given size), or other processing characteristic. In some embodiments, the system may determine a set of processing characteristics for the first applet request. For example, the first applet request may include one or more user-specified (or other default) processing characteristics, such as the use of a specific network, specific current, and/or an application programming interface value. By doing so, the system may use the first processing characteristic (or set of processing characteristics) to filter connection paths, thereby reducing the cost of the rotating key communication, improving security, decreasing system latency and downtime, and maintaining rotating key communication security respective of the first processing characteristic.

At step 406, process 400 (e.g., using one or more components described above) determines a plurality of server locations. For example, the system may determine a first plurality of server locations of the first server host across the one or more computer networks. As a given server host may be available on a multitude of different networks, wallets, addresses, services, or exchanges, the system may determine each location that the server host is available through. By doing so, the system may determine a small set of locations where the first server host is available as opposed to considering all possible computer networks, thereby reducing the amount of computer processing resources required to generate network processing routes recommendations.

In some embodiments, the system may compare connection characteristics to characteristics of a device facilitating the first applet request to determine the first plurality of server locations of the first server host. For example, the system may determine a connection characteristic for the first server host. Thus, upon determining a connection characteristic for the first server host, process 400 may compare the connection characteristic to characteristics of a device facilitating the first applet request. As an example, by comparing the connection characteristic to characteristics of a device facilitating the first applet request (e.g., available at differing locations), the system may determine such locations of where the first server host (or similar asset with respect to the first server host, such as connection paths, devices used, etc. corresponding to the first server host) may be located.

In some embodiments, the first plurality of server locations may be filtered based on server host domain addresses. For example, the system may retrieve known server host domain addresses validated by a platform service and may filter the first plurality of server locations based on the known server host domain addresses (e.g., for the first plurality of server locations) to generate the first subset of the first plurality of server locations. For instance, some networks in which server hosts are available may be trustworthy and secure, whereas others are untrustworthy and unsecured. To maintain system security for performing rotating key communications, a platform service (e.g., a service that controls one or more rotating key communications, a service that is related to validating rotating key communications, etc.) may store information related to whether a server host is a trusted entity, a security entity, or a valid/legitimate entity. The system may independently validate known server host domains and/or label known server host domains as such, and these labels may be used when determining locations to which a server host to be accessed is located. By doing so, the system may maintain a higher level of security by filtering out locations that may be accessed (e.g., for the server host) to only locations that are known/validated locations.

At step 408, process 400 (e.g., using one or more components described above) determines a plurality of connection paths. For example, the system may determine a first plurality of connection paths to a first subset of the first plurality of server locations. As the locations to which the first server host is available have been determined, accessing the server host may have differing routes available. For instance, a given server host may reside on two different blockchains (e.g., blockchain1 and blockchain2). However, to get to either of blockchain1 or blockchain2 (e.g., to access the server host), multiple rotating key communications may be required to take place (e.g., via one or more exchanges, liquidity pools, cross-chain bridges, wrapping services, swap services, price services, etc.). Process 400 may determine a first plurality of connection paths to a first subset of the first plurality of server locations to determine "how" to access the server host and, as will later be explained, which route is indeed the most efficient route to access the server host.

In some embodiments, determining a first plurality of connection paths may be based on a ranking. For example, the system may determine the first plurality of connection paths to the first subset of the first plurality of server locations by first determining a plurality of authentication schemes for use in performing rotating key communications across the one or more computer networks. The system may then generate a ranking of the plurality of authentication schemes for the first subset of the first plurality of server locations and may filter the ranking based on the first processing characteristic (e.g., as indicated via the applet request). For example, when filtering available routes, the system may filter orders in which networks are used based on the processing characteristic. For example, the system may filter a first order of networks based on a maximum fee corresponding to using the first order to process a rotating key communication.

In some embodiments, determining a first plurality of connection paths may be based on an artificial intelligence model. For example, determining a first plurality of connection paths to the first subset of the first plurality of server locations may be based on an artificial intelligence model. As discussed above, due to the vast array of locations where server hosts reside, the numerous paths in which to access the server host, and the different transactions that must take place to access such assets, using one or more artificial intelligence models may be advantageous to determine different connection paths to the locations. As such, the system may first determine a plurality of authentication schemes for use in performing rotating key communications across the one or more computer networks. For example, the system may determine the networks that are available to be used to access the server host.

In some embodiments, the system may generate a feature input for the artificial intelligence model. For example, the system may generate the feature input based on the plurality of authentication schemes. The system may first determine a plurality of authentication characteristics for the plurality of authentication schemes. Authentication characteristics may refer to the consensus protocols, token standards, asset type (e.g., cryptocurrency, NFT, token, etc.), security, transparency (e.g., transparency of fees), or other security characteristics. The system may then generate the feature input for the artificial intelligence model, such as an array of values representing the plurality of authentication characteristics. For example, the array of values may be an array of numbers, alphanumeric characters, or other values configured to be inputted into an artificial intelligence model. In some embodiments, the artificial intelligence model may be a Neural Network (NN), Recurrent Neural Network (RNN), Support Vector Machine (SVM), Convolutional Neural Network (CNN), deep learning model, decision tree, logistic regression model, or other artificial intelligence model. In some embodiments, the feature input may be based on the authentication characteristics and the first plurality of server locations (e.g., to which a server host resides). For example, the system may generate the feature input as an array of values representing (i) the authentication characteristics and (ii) the first plurality of server locations. In this way, the feature input may be provided to the artificial intelligence model to determine a set of connection paths associated with accessing the first server host.

In some embodiments, the system may input the feature input into the artificial intelligence model to generate an output. For example, the output may be a set of connection paths associated with accessing the first server host. For instance, the output may include multiple connection paths (e.g., including one or more networks) that the system may interact with to access the first server host. As such, the system may determine the first plurality of connection paths to the first subset of the first plurality of server locations based on the output. By using an artificial intelligence model to determine a set of connection paths (e.g., to the first subset of the first plurality of server locations), the system may reduce the cost of performing rotating key communications and improve the user experience as such determination may quickly identify available connection paths to access a given server host.

In some embodiments, determining the first plurality of connection paths to the first subset of the first plurality of server locations may be based on a priority. For example, the system may first determine (i) a first plurality of authentication schemes and (ii) a second plurality of authentication schemes for use in performing rotating key communications across the one or more computer networks. The system may then prioritize use of the first plurality of authentication schemes to determine the first plurality of connection paths to the first subset of the first plurality of server locations. For example, the system may favor particular networks, accounts, server host domains, or other blockchain-related networks/locations when determining a connection path. For example, the first plurality of authentication schemes may indicate "favored" networks (e.g., trusted networks, secure networks, low-fee networks, etc.), and the second plurality of authentication schemes may indicate "unfavored" networks (e.g., not-trusted networks, unsecured networks, high-fee networks, etc.). As another example, the first plurality of authentication schemes may comprise schemes that meet certain security requirements associated with the processing characteristic (e.g., as determined from the applet request), and the second plurality of authentication schemes may comprise schemes that do not meet certain security requirements associated with the processing characteristic. In this way, the system may prioritize the use of certain networks, thereby maintaining rotating key communication security.

At step 410, process 400 filters the first plurality of connection paths based on the processing characteristic. As discussed above, the processing characteristic may be related to the processing of the rotating key communication. For instance, to access a server host with the lowest overall cost, the system may filter the first plurality of connection paths to determine the connection path with the lowest overall cost. As another example, to access a server host with the fastest possible transaction speed (e.g., to avoid exchange application programming interface), the system may filter the first plurality of connection paths to determine the shortest path (e.g., route) possible to access the server host. Although each of the first plurality of connection paths may be a sufficient vehicle for accessing the server host, some of the connection paths may not be suitable based on the applet request. For example, the applet request may specify a particular processing characteristic for performing the rotating key communication. As such, the system may filter the first plurality of connection paths to generate a first subset of the plurality of connection paths that are associated with the processing characteristic. By doing so, the system may generate a subset of connection paths that may be suitable for the given applet request—thereby reducing the amount of computer processing and computer memory resources required to generate a recommendation for performing the first rotating key communication.

In some embodiments, the system may filter the first plurality of connection paths according to individual networks. For example, the system may determine a first network and a second network in the first plurality of connection paths. The system may then filter the first network and the second network based on the first processing characteristic. For instance, each connection path may include one or more networks (e.g., as the connection path is a path to the server host).

In some embodiments, filtering the first plurality of connection paths may be based on a threshold ranking. For example, the system may filter the first plurality of connection paths based on the first processing characteristic to generate the first subset of the plurality of connection paths by ranking the first plurality of connection paths based on the first processing characteristic. For instance, by ranking the first plurality of connection paths based on the first processing characteristic, the system may generate a plurality of rankings. The system may then filter the plurality of rankings based on a threshold ranking to determine the first subset of the plurality of connection paths. The threshold ranking may represent a predetermined value.

For example, where the processing characteristic is an application programming interface, the system may rank each connection path of the first plurality of connection paths based on the application programming interface. For example, where the application programming interface (e.g., indicated by the processing characteristic) has a 0.5% error rate and/or is otherwise incompatible, the system may select a different path and/or application programming interface. Thus, the system may rank the first connection path and the second connection path in a descending order corresponding to the processing characteristic (e.g., the first connection path may be ranked first and the second connection path may be ranked second based on their respective application programming interface). The system may then filter the rankings of the first and second connection paths based on the threshold ranking to determine the first subset of connection paths. As such, the first connection path may be part of the first subset of connection paths. By doing so, the system may determine the most efficient connection paths with respect to the processing characteristic via the ranking—thereby providing the best recommendation for performing the first rotating key communication.

In some embodiments, filtering the first plurality of connection paths may be based on the use of a given network. For example, the system may filter the first plurality of connection paths based on the first processing characteristic to generate the first subset of the plurality of connection paths by first determining a network corresponding to the first processing characteristic. The system may then filter the first plurality of connection paths based on whether each of the connection paths in the first plurality of connection paths includes the network. As each connection path (e.g., of the first plurality of connection paths) may include different networks to "pass through" or transact with to obtain the first server host, some of these connection paths may include networks that are unsafe to transact with (e.g., do not meet KYC requirements, fail to meet certain token protocols, etc.). Therefore, the first applet request may specify the use of a particular network that is known to be safe to obtain the first server host. The system may determine the network (e.g., network name, network identifier, or other network-related information) that corresponds to the processing characteristic (e.g., denoting the particular network) and may filter each of the connection paths to connection paths that include the given network. By doing so, the system may ensure secure obtainment of the first server host by filtering connection paths that include the indicated network.

In some embodiments, filtering the first plurality of connection paths may be based on a maximum fee. For example, the system may filter the first plurality of connection paths based on the first processing characteristic to generate the first subset of the plurality of connection paths by first determining a maximum fee requirement corresponding to the first processing characteristic (e.g., a maximum interchange fee). As an example, the first processing characteristic may indicate a maximum fee of 0.00231 ETH. The system may then determine a respective maximum fee for each of the connection paths in the first plurality of connection paths. In one use case, where the first plurality of connection paths comprises a first connection path including a first network and a second connection path including a second network and a third network (e.g., to access the first server host), the system may determine the total fees required to obtain the first server host via each connection path. As each network may use its own fees to complete a transaction over the network, the system may add the total fees required for each connection path (e.g., respective of each network that is included in a given route). The system may then filter the first plurality of connection paths based on the respective maximum fee to generate the first subset of the plurality of connection paths. For example, the connection paths that do not exceed the maximum fee (e.g., corresponding to the processing characteristic) may be included in the first subset of the plurality of connection paths.

In some embodiments, filtering the first plurality of connection paths may be based on an application programming interface. For example, the system may filter the first plurality of connection paths based on the first processing characteristic to generate the first subset of the plurality of connection paths by first determining an application programming interface compatibility corresponding to the first processing characteristic.

In some embodiments, filtering the first plurality of connection paths may be based on a processing speed. For example, the system may filter the first plurality of connection paths based on the first processing characteristic to generate the first subset of the first plurality of connection paths by first determining a processing speed requirement corresponding to the first processing characteristic. For instance, a user may want to obtain the server host as fast as possible, which, in volatile networks, may reduce the amount of application programming interface a given asset may experience. To accomplish this, the system may determine that the processing speed requirement may be 6 tx/second (e.g., 6 transactions per second). The system may then determine the processing speed for each of the connection paths in the first plurality of connection paths. For example, the system may add the processing speed for each network in a given connection path or may average the processing speed for each network in a given connection path to determine the processing speed for each of the connection paths in the first plurality of connection paths. Upon determining the processing speed for each connection path in the first plurality of connection paths, the system may filter the first plurality of connection paths based on the processing speed requirement to generate the first subset of the plurality of connection paths. For example, each connection path included in the first subset of the plurality of connection paths may have a processing speed that does not exceed the processing speed requirement. By doing so, the system may reduce the effects of asset application programming interface by filtering the connection paths based on the processing speed requirement.

In some embodiments, filtering the first plurality of connection paths may be based on a batching requirement. For example, the system may filter the first plurality of connection paths based on the first processing characteristic to generate the first subset of the plurality of connection paths by first determining that the first processing characteristic requires batching the first rotating key communication. For instance, the first processing characteristic may comprise an applet request to batch the first rotating key communication. Transaction batching comprises combining multiple rotating key communications into a single rotating key communication. By doing so, the rotating key communications are able to amortize the overhead cost of an individual communication across the multiple communications, which reduces the effective fee per communication. This has the added benefit of also reducing the load on the network as each new block has limited space available and batching allows for more communications in a smaller space.

Therefore, the system may filter the first plurality of connection paths based on whether each of the connection paths in the first plurality of connection paths allows batching rotating key communications. For example, the system may determine that a connection path allows batching based on the network(s) included in the connection path. For instance, the system may refer to a database storing network-related information (e.g., such as whether a given network allows batching) or perform web scraping to determine whether a network allows batching. The system may determine that a connection path allows batching based on (i) whether all the networks included in the network allow batching or (ii) whether at least one network included in the network allows batching. Upon determining whether each connection path of the first plurality of connection paths allows batching, the system may generate the first subset of the plurality of connection paths, where the first subset includes the connection paths that allow batching. By doing so, as discussed above, the system may reduce the overhead cost of performing rotating key communications while reducing system latency and network load.

In some embodiments, filtering the first plurality of connection paths may be based on a batching size requirement. For example, the system may filter the first plurality of connection paths based on the first processing characteristic to generate the first subset of the plurality of connection paths by first determining that the processing characteristic requires batching of the first rotating key communication into a batch of a first batch size. The processing characteristic may comprise an applet request to batch the first rotating key communication in a batch of a given size. This may have the benefit of limiting fees to a particular amount. For example, the size of a batch may correspond to the overall fees (e.g., fees, transaction fees, or other fees associated with a transaction/batch) when a rotating key communication is performed. Although batching multiple rotating key communications reduces the cost of each individual communication when added together, the larger the batch, the larger the fees for that batch may be. By selecting a given size of a batch (e.g., a batch including 4 transactions, 6 transactions, 100 transactions, etc.), the user may be able to control the fee associated with the given batch communication. Therefore, when the processing characteristic indicates a batch of a first batch size, the system may monitor for additional rotating key communications to include in the batch. For example, the user may want to access a second server host via a second network communication. As such, the system may monitor for other incoming rotating key communications to add to the batch. In some embodiments, the system may continue to monitor for other incoming rotating key communications until the batch satisfies the first batch size (e.g., the batch includes the indicated amount of communications for the batch). By doing so, the system may reduce network latency, load, and the cost of performing rotating key communications.

At step 412, process 400 (e.g., using one or more components described above) generates a rotating key. For example, the system may generate a first rotating key (e.g., on a first user device) for performing the first rotating key communications based on the first subset of the plurality of connection paths. The first rotating key may also be generated to be specific to one or more processing characteristics such as (i) a connection path (e.g., the set of networks to access the server host), (ii) a server host, (iii) fees associated with the rotating key communication (e.g., fees for each network, total fees, or other fees, platform service fees), (iv) the location of the server host (e.g., a network, a wallet, an entity, or other location), (v) a payment method (e.g., how the user will pay for the server host), (vi) the value of the server host, etc.

In some embodiments, the system may generate a second recommendation for performing the first rotating key communication. For example, the system may receive a second applet request to apply a second processing characteristic. For instance, the user may want to access the first server host via a connection path that not only includes a specific network but is also below a maximum fee. Thus, the system may filter the first subset of the plurality of connection paths based on the second processing characteristic (e.g., the maximum fee) to generate a second subset of the plurality of connection paths.

In some embodiments, the system may generate the first rotating key based on known server host domains. For example, the system may retrieve a list of known server host domains and filter the first subset of the plurality of connection paths based on the list of known server host domains. By filtering the first subset of the plurality of connection paths based on the list of known server host domains (e.g., trusted server host domains, secure server host domains, favored server host domains, etc.), the system may generate a second subset of the plurality of connection paths, where the first rotating key is further based on the second subset of the plurality of connection paths. By doing so, the system may further filter the connection paths to ensure that only known server host domains (or routes with known server host domains) are used, thereby improving the user experience and increasing rotating key communication security.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims that follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for performing secure communications with rotating key communications.
2. The method of any one of the preceding embodiments, further comprising: receiving a first applet request to perform a first rotating key communication across one or more computer networks to access a first server host; determining a first processing characteristic for the first applet request; determining a first plurality of server locations of the first server host across the one or more computer networks; determining a first plurality of connection paths to a first subset of the first plurality of server locations; filtering the first plurality of connection paths based on the first processing characteristic to generate a first subset of the first plurality of connection paths; and generating a first rotating key, for a pair of devices, for performing the first rotating key communication based on the first subset of the first plurality of connection paths.
3. The method of any one of the preceding embodiments, further comprising: receiving a second applet request to apply a second processing characteristic; filtering the first subset of the first plurality of connection paths based on the second processing characteristic to generate a second subset of the first plurality of connection paths; and generating a second recommendation, for the pair of devices, for performing the first rotating key communication based on the second subset of the first plurality of connection paths.

4. The method of any one of the preceding embodiments, further comprising: retrieving a list of known server host domains; and filtering the first subset of the first plurality of connection paths based on the list of known server host domains to generate a second subset of the first plurality of connection paths, wherein the first rotating key is further based on the second subset of the first plurality of connection paths.
5. The method of any one of the preceding embodiments, further comprising: retrieving known server host domain addresses validated by a platform service; and filtering the first plurality of server locations based on the known server host domain addresses for the first plurality of server locations to generate the first subset of the first plurality of server locations.
6. The method of any one of the preceding embodiments, wherein determining the first plurality of server locations of the first server host across the one or more computer networks further comprises: determining a connection characteristic for the first server host; and comparing the connection characteristic to characteristics of a device facilitating the first applet request.
7. The method of any one of the preceding embodiments, wherein filtering the first plurality of connection paths based on the first processing characteristic to generate the first subset of the first plurality of connection paths further comprises: determining a first network and a second network in the first plurality of connection paths; and filtering the first network and the second network based on the first processing characteristic.
8. The method of any one of the preceding embodiments, wherein determining the first plurality of connection paths to the first subset of the first plurality of server locations further comprises: determining a plurality of authentication schemes for use in performing rotating key communications across the one or more computer networks; generating a ranking of the plurality of authentication schemes for the first subset of the first plurality of server locations; and filtering the ranking based on the first processing characteristic.
9. The method of any one of the preceding embodiments, wherein determining the first plurality of connection paths to the first subset of the first plurality of server locations further comprises: determining a plurality of authentication schemes for use in performing rotating key communications across the one or more computer networks; generating a feature input based on the plurality of authentication schemes; inputting the feature input into an artificial intelligence model to generate an output; and determining the first plurality of connection paths to the first subset of the first plurality of server locations based on the output.
10. The method of any one of the preceding embodiments, wherein generating the feature input based on the plurality of authentication schemes further comprises: determining a plurality of authentication characteristics for the plurality of authentication schemes; and generating an array of values representing the plurality of authentication characteristics.
11. The method of any one of the preceding embodiments, wherein filtering the first plurality of connection paths based on the first processing characteristic to generate the first subset of the first plurality of connection paths further comprises: ranking the first plurality of connection paths based on the first processing characteristic to generate a plurality of rankings; and filtering the plurality of rankings based on a threshold ranking to determine the first subset of the first plurality of connection paths.
12. The method of any one of the preceding embodiments, wherein filtering the first plurality of connection paths based on the first processing characteristic to generate the first subset of the first plurality of connection paths further comprises: determining a network corresponding to the first processing characteristic; and filtering the first plurality of connection paths based on whether each connection path in the first plurality of connection paths includes the network.
13. The method of any one of the preceding embodiments, wherein filtering the first plurality of connection paths based on the first processing characteristic to generate the first subset of the first plurality of connection paths further comprises: determining a maximum fee requirement corresponding to the first processing characteristic; determining a respective maximum fee for each connection path in the first plurality of connection paths; and filtering the first plurality of connection paths based on the respective maximum fee.
14. The method of any one of the preceding embodiments, wherein filtering the first plurality of connection paths based on the first processing characteristic to generate the first subset of the first plurality of connection paths further comprises: determining an application programming interface requirement corresponding to the first processing characteristic; determining a respective application programming interface for each connection path in the first plurality of connection paths; and filtering the first plurality of connection paths based on the respective application programming interface.
15. The method of any one of the preceding embodiments, wherein filtering the first plurality of connection paths based on the first processing characteristic to generate the first subset of the first plurality of connection paths further comprises: determining that the first processing characteristic requires batching the first rotating key communication; and filtering the first plurality of connection paths based on whether each connection path in the first plurality of connection paths allows batching rotating key communications.
16. The method of any one of the preceding embodiments, wherein determining the first plurality of connection paths to the first subset of the first plurality of server locations further comprises: determining a first plurality of authentication schemes for use in performing rotating key communications across the one or more computer networks; determining a second plurality of authentication schemes for use in performing rotating key communications across the one or more computer networks; and prioritizing use of the first plurality of authentication schemes to determine the first plurality of connection paths to the first subset of the first plurality of server locations.
17. The method of any one of the preceding embodiments, wherein receiving the first applet request to perform the first rotating key communication across the one or more computer networks to access the first server host further comprises: detecting, by a first device, that a second device is within a predetermined location, wherein the second device comprises a near field communication tag and a first applet, wherein the first applet is configured to facilitate the first applet request in response to being within the predetermined location; and transmitting, by the second device, the first applet request.

18. A non-transitory, computer-readable medium storing instructions that, when executed by a data processing apparatus, cause the data processing apparatus to perform communications comprising those of any of embodiments 1-17.

19. A system comprising one or more processors; and memory storing instructions that, when executed by the processors, cause the processors to effectuate communications comprising those of any of embodiments 1-17.

20. A system comprising means for performing any of embodiments 1-17.

What is claimed is:

1. A system for performing secure communications with rotating key communications using applets linked to near field communication tags, the system comprising:
a first device comprising a near field communication tag and a first applet, wherein the first applet is configured to facilitate a first applet request in response to being located near a second device configured to transmit the first applet request to perform a first rotating key communication to access a first server host; and
a platform service configured to:
receive the first applet request;
determine a first processing characteristic for the first applet request;
determine a first plurality of server locations of the first server host across one or more computer networks;
retrieve known server host domain addresses validated by the platform service;
filter the first plurality of server locations based on the known server host domain addresses for the first plurality of server locations to generate a first subset of the first plurality of server locations;
determine a plurality of connection paths to the first subset of the first plurality of server locations;
filter the plurality of connection paths based on the first processing characteristic to generate a first subset of the plurality of connection paths; and
generate a first rotating key for performing the first rotating key communication based on the first subset of the plurality of connection paths.

2. A method for performing secure communications with rotating key communications, the method comprising:
receiving a first applet request to perform a first rotating key communication across one or more computer networks to access a first server host;
determining a first processing characteristic for the first applet request;
determining a first plurality of server locations of the first server host across the one or more computer networks;
determining a first plurality of connection paths to a first subset of the first plurality of server locations;
filtering the first plurality of connection paths based on the first processing characteristic to generate a first subset of the first plurality of connection paths; and
generating a first rotating key, for a pair of devices, for performing the first rotating key communication based on the first subset of the first plurality of connection paths.

3. The method of claim 2, further comprising:
receiving a second applet request to apply a second processing characteristic;
filtering the first subset of the first plurality of connection paths based on the second processing characteristic to generate a second subset of the first plurality of connection paths; and
generating a second recommendation, for the pair of devices, for performing the first rotating key communication based on the second subset of the first plurality of connection paths.

4. The method of claim 2, further comprising:
retrieving a list of known server host domains; and
filtering the first subset of the first plurality of connection paths based on the list of known server host domains to generate a second subset of the first plurality of connection paths, wherein the first rotating key is further based on the second subset of the first plurality of connection paths.

5. The method of claim 2, further comprising:
retrieving known server host domain addresses validated by a platform service; and
filtering the first plurality of server locations based on the known server host domain addresses for the first plurality of server locations to generate the first subset of the first plurality of server locations.

6. The method of claim 2, wherein determining the first plurality of server locations of the first server host across the one or more computer networks further comprises:
determining a connection characteristic for the first server host; and
comparing the connection characteristic to characteristics of a device facilitating the first applet request.

7. The method of claim 2, wherein filtering the first plurality of connection paths based on the first processing characteristic to generate the first subset of the first plurality of connection paths further comprises:
determining a first network and a second network in the first plurality of connection paths; and
filtering the first network and the second network based on the first processing characteristic.

8. The method of claim 2, wherein determining the first plurality of connection paths to the first subset of the first plurality of server locations further comprises:
determining a plurality of authentication schemes for use in performing rotating key communications across the one or more computer networks;
generating a ranking of the plurality of authentication schemes for the first subset of the first plurality of server locations; and
filtering the ranking based on the first processing characteristic.

9. The method of claim 2, wherein determining the first plurality of connection paths to the first subset of the first plurality of server locations further comprises:
determining a plurality of authentication schemes for use in performing rotating key communications across the one or more computer networks;
generating a feature input based on the plurality of authentication schemes;
inputting the feature input into an artificial intelligence model to generate an output; and
determining the first plurality of connection paths to the first subset of the first plurality of server locations based on the output.

10. The method of claim 9, wherein generating the feature input based on the plurality of authentication schemes further comprises:
determining a plurality of authentication characteristics for the plurality of authentication schemes; and
generating an array of values representing the plurality of authentication characteristics.

11. The method of claim 2, wherein filtering the first plurality of connection paths based on the first processing characteristic to generate the first subset of the first plurality of connection paths further comprises:
  ranking the first plurality of connection paths based on the first processing characteristic to generate a plurality of rankings; and
  filtering the plurality of rankings based on a threshold ranking to determine the first subset of the first plurality of connection paths.

12. The method of claim 2, wherein filtering the first plurality of connection paths based on the first processing characteristic to generate the first subset of the first plurality of connection paths further comprises:
  determining a network corresponding to the first processing characteristic; and
  filtering the first plurality of connection paths based on whether each connection path in the first plurality of connection paths includes the network.

13. The method of claim 2, wherein filtering the first plurality of connection paths based on the first processing characteristic to generate the first subset of the first plurality of connection paths further comprises:
  determining a maximum fee requirement corresponding to the first processing characteristic;
  determining a respective maximum fee for each connection path in the first plurality of connection paths; and
  filtering the first plurality of connection paths based on the respective maximum fee.

14. The method of claim 2, wherein filtering the first plurality of connection paths based on the first processing characteristic to generate the first subset of the first plurality of connection paths further comprises:
  determining an application programming interface requirement corresponding to the first processing characteristic;
  determining a respective application programming interface for each connection path in the first plurality of connection paths; and
  filtering the first plurality of connection paths based on the respective application programming interface.

15. The method of claim 2, wherein filtering the first plurality of connection paths based on the first processing characteristic to generate the first subset of the first plurality of connection paths further comprises:
  determining that the first processing characteristic requires batching the first rotating key communication; and
  filtering the first plurality of connection paths based on whether each connection path in the first plurality of connection paths allows batching rotating key communications.

16. The method of claim 2, wherein determining the first plurality of connection paths to the first subset of the first plurality of server locations further comprises:
  determining a first plurality of authentication schemes for use in performing rotating key communications across the one or more computer networks;
  determining a second plurality of authentication schemes for use in performing rotating key communications across the one or more computer networks; and
  prioritizing use of the first plurality of authentication schemes to determine the first plurality of connection paths to the first subset of the first plurality of server locations.

17. The method of claim 2, wherein receiving the first applet request to perform the first rotating key communication across the one or more computer networks to access the first server host further comprises:
  detecting, by a first device, that a second device is within a predetermined location, wherein the second device comprises a near field communication tag and a first applet, wherein the first applet is configured to facilitate the first applet request in response to being within the predetermined location; and
  transmitting, by the second device, the first applet request.

18. A non-transitory, computer-readable medium comprising instructions that, when executed by one or more processors, cause communications comprising:
  receiving a first applet request to perform a first rotating key communication across one or more computer networks to access a first server host;
  determining a first processing characteristic for the first applet request;
  determining a first plurality of server locations of the first server host across the one or more computer networks;
  determining a first plurality of connection paths to a first subset of the first plurality of server locations;
  selecting one of the first subset based on the first processing characteristic; and
  generating a first rotating key, for a pair of devices, for performing the first rotating key communication.

19. The non-transitory, computer-readable medium of claim 18, wherein the instructions further cause communications comprising:
  retrieving a list of known server host domains; and
  filtering the first subset of the first plurality of connection paths based on the list of known server host domains to generate a second subset of the first plurality of connection paths, wherein the first rotating key is further based on the second subset of the first plurality of connection paths.

20. The non-transitory, computer-readable medium of claim 18, wherein the instructions further cause communications comprising:
  retrieving known server host domain addresses validated by a platform service; and
  filtering the first plurality of server locations based on the known server host domain addresses for the first plurality of server locations to generate the first subset.

* * * * *